(12) United States Patent
Kalitan et al.

(10) Patent No.: US 12,360,504 B2
(45) Date of Patent: Jul. 15, 2025

(54) METHODS AND SYSTEMS FOR ENERGY STORAGE DISPATCH

(71) Applicant: GENERAL ELECTRIC COMPANY, Schenectady, NY (US)

(72) Inventors: Danielle Marie Kalitan, Rexford, NY (US); Olugbenga Anubi, Tallahassee, FL (US); Richard Hayes Cutright, Corinth, NY (US); Hullas Sehgal, Niskayuna, NY (US); Michael Kinstrey, Niskayuna, NY (US); Johanna Wellington, Ballston, NY (US)

(73) Assignee: GE GRID SOLUTIONS LLC, Atlanta, GA (US)

( * ) Notice: Subject to any disclaimer, the term of this patent is extended or adjusted under 35 U.S.C. 154(b) by 321 days.

(21) Appl. No.: 17/274,982

(22) PCT Filed: Sep. 14, 2018

(86) PCT No.: PCT/US2018/051065
§ 371 (c)(1),
(2) Date: Mar. 10, 2021

(87) PCT Pub. No.: WO2020/055423
PCT Pub. Date: Mar. 19, 2020

(65) Prior Publication Data
US 2022/0057767 A1 Feb. 24, 2022

(51) Int. Cl.
*G05B 19/042* (2006.01)
*G06Q 10/0631* (2023.01)
*G06Q 50/06* (2024.01)

(52) U.S. Cl.
CPC ..... *G05B 19/042* (2013.01); *G06Q 10/06315* (2013.01); *G06Q 50/06* (2013.01); *G05B 2219/2639* (2013.01)

(58) Field of Classification Search
CPC .......... G05B 19/042; G05B 2219/2639; G06Q 10/06315; G06Q 50/06; Y02P 90/82
See application file for complete search history.

(56) References Cited

U.S. PATENT DOCUMENTS 6,957,048 B2 * 10/2005 Formenti .............. H02J 7/0013
455/572
8,600,571 B2  12/2013 Dillon et al.
(Continued)

FOREIGN PATENT DOCUMENTS

CN  102377248 A   3/2012
EP  2612026 B1   10/2015
(Continued)

OTHER PUBLICATIONS

International Search Report and Written Opinion dated Nov. 12, 2018 which was issued in connection with PCT/US18/051065 which was filed on Sep. 14, 2018.
(Continued)

*Primary Examiner* — M. N. Von Buhr
(74) *Attorney, Agent, or Firm* — Armstrong Teasdale LLP

(57) ABSTRACT

A method of energy dispatch for an energy storage device component of a local energy generation plant, the method including obtaining a charge/discharge profile for the energy storage device, quantifying an amount of energy generation available from energy source components of the local energy generation plant, accessing a degradation factor for the energy storage device, forecasting a future cost for storing energy in the energy storage device, evaluating the future cost, providing instruction to an energy storage plant control unit to increase energy storage in the energy storage device based on a result of the evaluation, else, instructing the energy storage plant control unit to decrease energy storage in the energy storage device, and shedding power from the energy source components if a recommendation to shed (Continued)

power was provided. A system for implementing the method and a non-transitory computer-readable medium are also disclosed.

18 Claims, 6 Drawing Sheets

(56) References Cited

U.S. PATENT DOCUMENTS

| | | | | |
|---|---|---|---|---|
| 8,930,035 | B2* | 1/2015 | Marroyo Palomo | G06Q 10/06 700/287 |
| 9,026,259 | B2 | 5/2015 | Zadeh et al. | |
| 9,077,204 | B2 | 7/2015 | More et al. | |
| 9,201,411 | B2* | 12/2015 | Bozchalui | G05B 19/042 |
| 9,509,176 | B2 | 11/2016 | Carter et al. | |
| 9,568,901 | B2 | 2/2017 | Hooshmand et al. | |
| 9,711,987 | B2* | 7/2017 | Choi | H02J 3/32 |
| 9,835,661 | B2* | 12/2017 | Kubota | H02J 3/381 |
| 9,836,032 | B2* | 12/2017 | Kubota | H01M 10/465 |
| 9,960,637 | B2 | 5/2018 | Sanders et al. | |
| 9,977,847 | B2* | 5/2018 | Dannecker | G06Q 50/06 |
| 10,381,835 | B1* | 8/2019 | Gubba Ravikumar | G05B 17/02 |
| 10,498,155 | B2* | 12/2019 | Varadarajan | H02J 7/34 |
| 10,747,252 | B2* | 8/2020 | Kearns | G05F 1/66 |
| 11,117,486 | B2* | 9/2021 | Logvinov | B60L 53/64 |
| 11,522,487 | B2* | 12/2022 | Dong | H02S 10/20 |
| 11,621,563 | B2* | 4/2023 | Parish | G05B 15/02 700/287 |
| 11,689,028 | B2* | 6/2023 | Amthor | H02J 3/06 307/20 |
| 11,770,098 | B2* | 9/2023 | Hansen | H02J 3/004 320/132 |
| 11,973,344 | B2* | 4/2024 | Fife | H02J 13/00032 |
| 2010/0308765 | A1 | 12/2010 | Moore et al. | |
| 2011/0082598 | A1* | 4/2011 | Boretto | H02J 3/466 700/297 |
| 2015/0330365 | A1 | 11/2015 | Deb et al. | |
| 2017/0091878 | A1 | 3/2017 | Subburaj | |
| 2017/0186108 | A1* | 6/2017 | Itaya | H02J 3/00 |
| 2017/0229881 | A1* | 8/2017 | Pourmousavi Kani | H02J 3/381 |
| 2017/0285111 | A1 | 10/2017 | Fife | |
| 2018/0034312 | A1 | 2/2018 | Abdulla et al. | |
| 2018/0097126 | A1 | 4/2018 | Gonatas | |
| 2019/0181680 | A1* | 6/2019 | Magnani | H02J 3/38 |
| 2020/0259358 | A1* | 8/2020 | Hansen | G06Q 10/063 |
| 2022/0138873 | A1* | 5/2022 | Yoo | G06Q 30/0283 705/412 |
| 2023/0261467 | A1* | 8/2023 | Fife | H02J 13/00032 700/287 |

FOREIGN PATENT DOCUMENTS

| | | | |
|---|---|---|---|
| EP | 3028358 | A1 | 4/2017 |
| WO | 2018156700 | A1 | 8/2018 |

OTHER PUBLICATIONS

David Wenzhong Gao, "Energy Storage for Sustainable Microgrid", p. ToC, Forew, 14-21, Sep. 10, 2015 (Sep. 10, 2015), Academic Press, XP055528882 ISBN: 9780128033746 p. 14-p. 21.

Wikipedia, "Battery management system", Sep. 11, 2018 (Sep. 11, 2018), Retrieved from the Internet: URL:https://en.wikipedia.org/w/index.php?title=Battery_management_system&oldid=859117384 XP055528892 [retrieved on Nov. 30, 2018] p. 1-p. 4.

Wikipedia, "State of health", Jan. 5, 2018 (Jan. 5, 2018), Retrieved from the Internet: URL:https://en.wikipedia.org/w/index.php?title=State_of_health&oldid=818746272 XP055528962 [retrieved on Nov. 30, 2018] p. 1-p. 2.

Wikipedia, "Grid energy storage", Aug. 3, 2018 (Aug. 3, 2018), Retrieved from the Internet: URL:https://en.wikipedia.org/w/index.php?title=Grid_energy_storage&oldid=853218523 XP055528972 [retrieved on Nov. 30, 2018] p. 1-p. 7.

Wikipedia, "Battery storage power station", Aug. 31, 2018 (Aug. 31, 2018), Retrieved from the Internet: URL:https://en.wikipedia.org/w/index.php?title=Battery_storage_power_station&oldid=857371615 XP055528973 [retrieved on Nov. 30, 2018] p. 1-p. 6.

Wikipedia, "Microgrid", Aug. 19, 2018 (Aug. 19, 2018), Retrieved from the Internet: URL:https://en.wikipedia.org/w/index.php?title=Microgrid&oldid=855595335 XP055529069 [retrieved on Nov. 30, 2018] p. 1-p. 7.

Yu Wang et al, "Online Algorithms for Optimal Energy Distribution in Microgrids", May 30, 2015 (May 30, 2015), Springer, XP055480961 ISBN: 9783319171326 p. 1-p. 24.

Tomislav D. et al., "Capacity Optimization of Renewable Energy Sources and Battery Storage in an Autonomous Telecommunication Facility", IEEE Transactions on Sustainable Energy, vol. 5, Issue: 4, pp. 1367-1378, 2014.

Kate A. et al., "Optimizing Storage and Renewable Energy Systems with REopt" Journal of National Renewable Energy Laboratory, 2017.

* cited by examiner

METHODS AND SYSTEMS FOR ENERGY STORAGE DISPATCH

BACKGROUND

Renewable energy sources such as solar and wind are not always able to meet electricity demand. For example, the production of solar energy is greatest during the middle of the day however, demand for that electricity does not reach a peak until the evening and early morning hours. To solve this mismatch in supply and demand, energy storage can be used in conjunction with renewable sources to store electricity when it is available and discharge it at a later time to serve the electrical load when needed. The management of charge and discharge functionality can be managed with rules-based methods. These rules-based methods can become unmanageable due to the amount of variables affecting the price of electricity and the useful life of the storage asset without sophisticated algorithms.

Conventionally, energy storage devices are typically installed at a power generation site where there are one or more power generation devices (operating from renewable and/or nonrenewable energy sources). When these power generators are coupled together, it is a non-trivial task to determine the best time-of-day to charge and/or discharge the energy storage devices while at the same time maximizing the usable life of the energy storage device(s) to maximize site revenue.

What is missing from the art are systems and methods that incorporate multiple factors (including, but not limited to, an energy storage device model with a battery life model and consideration of energy requirements of nested power generation sites positioned lower in a hierarchal structure) when determining control signals or instructions to either sink locally-generated energy into a local energy storage device, or source energy from the local energy storage device to electrical loads (either local or remote to the energy storage device).

DETAILED DESCRIPTION

Embodying systems and methods provide a determination regarding the optimal time to charge and discharge (i.e., dispatch) an energy storage device within an energy generation plant through a point of common electric coupling with other energy generation plants ("EGP"), electric power grids, and/or electrical substations.

In accordance with embodiments, an energy storage dispatch optimization algorithm considers the optimization problem by encompassing characteristics and parameters for one or many energy generation plants, and for the components within the EGPs. In accordance with embodiments, the optimization algorithm considers the use life of energy storage devices when determining when it is the optimal time to dispatch the energy storage device(s)—i.e., charge and/or discharge the energy storage device.

An embodying optimization algorithm considers numerous operating constraints to provide a charge/discharge power profile over a predetermined time horizon for the energy storage device. In accordance with embodiments, the optimization algorithm can generate a power shed recommendation signal that captures an amount of power needing to be shed by energy resources, in order to meet operational constraints. By inclusion of a battery life model in the optimization algorithm, the conventional approach of relying on a manually-implemented rules-based approach to determining when to charge/discharge is eliminated.

Figure 1A:
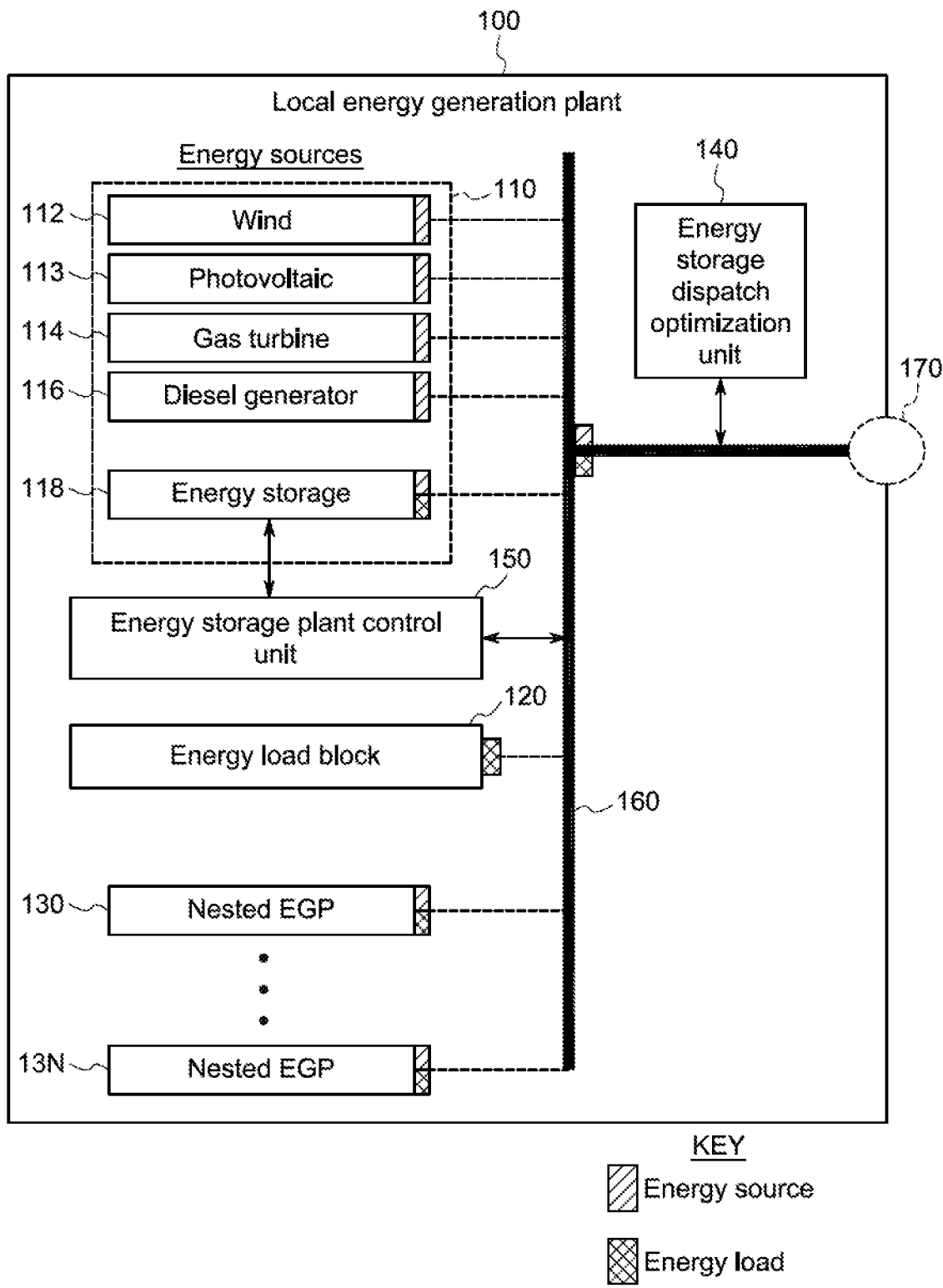
FIG. 1A schematically depicts a local energy generation plant in accordance with embodiments.
Figure 1B:
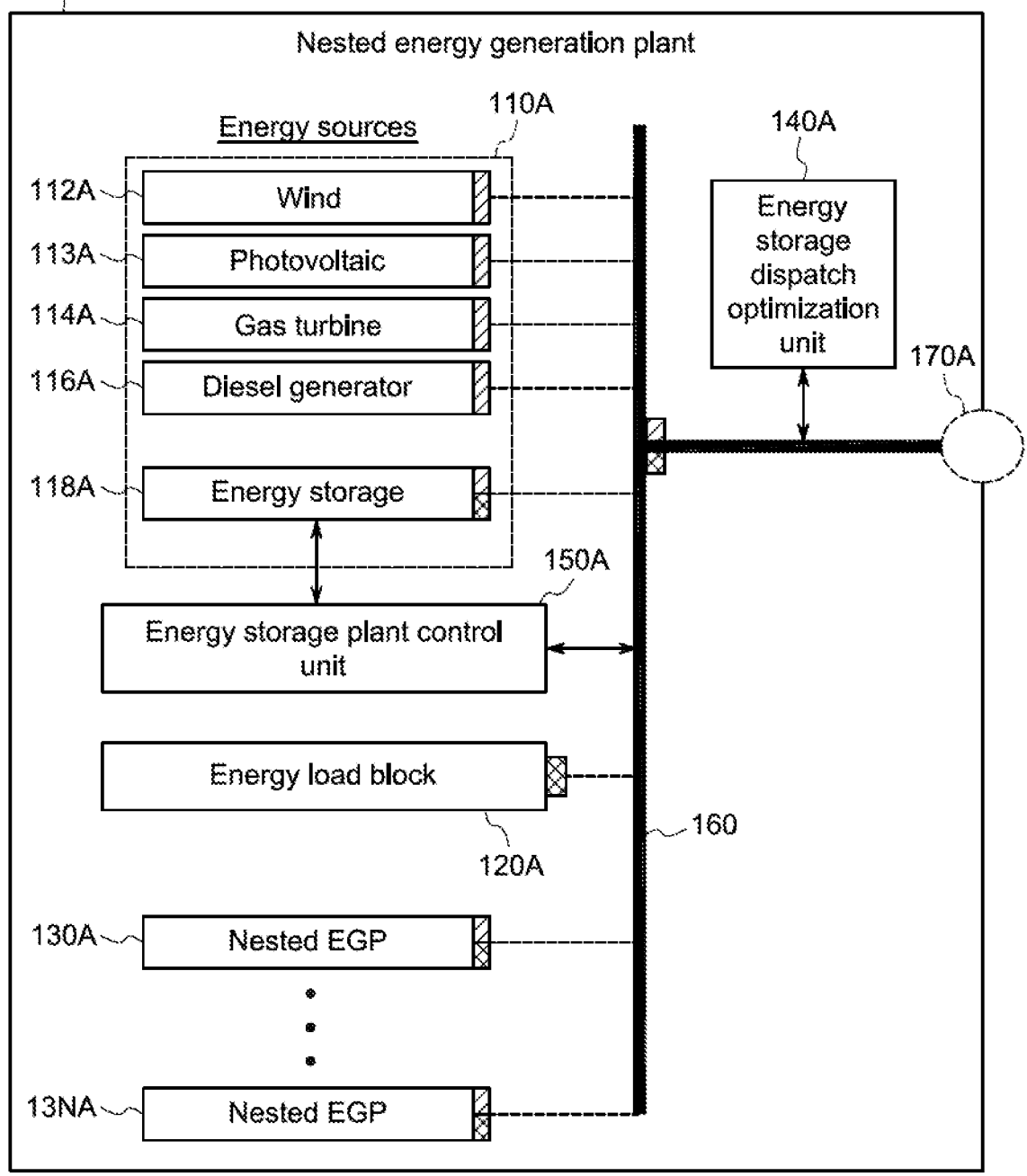
FIG. 1B schematically depicts a nested energy generation plant of FIG. 1A in accordance with embodiments.

FIG. 1A schematically depicts local energy generation plant 100 in accordance with embodiments. This local EGP includes one or more energy sources 110. These energy sources can be from renewable or nonrenewable sources (e.g., gas turbine 114, diesel generator 116, and other fossil fuel sources). Also among energy sources 110 can be photovoltaic panels 113 and wind turbine 112—hydro, geothermal, and other renewable sources are also suitable sources. The energy sources can be in electrical communication with feeder line 160. Local EGP 100 can include energy load block 120, which is also in electrical communication with feeder line 160.

Among the energy sources is one or more energy storage devices 118, which can source (discharge) energy to the feeder line; the energy storage device(s) can also sink (charge) energy from the feeder line. Embodiments are not limited to optimizing charge/discharge profiles and providing power shed recommendations for any particular energy storage technology.

Local EGP 100 can include one or more nested EGPs 130, ..., 13N. FIG. 1A depicts nested EGP 130, ..., 13N in accordance with embodiments. The nested EGPs are similar in configuration to local EGP 100, but are nested within the local EGP. For example, each nested EGP can include one or more energy sources 110A, an energy storage device 118A, load block 120A, etc., as described herein for local EGP 100. Each nested EGP can also include its own nested EGP 130A, ..., 13NA. The inclusion of nested EGPs 130A, ..., 13NA within nested EGPs 130, ..., 13N forms a hierarchical tree of EGPs within local EGP 100. As should be readily understood, each nested EGP 130A, ..., 13NA can itself include another set of nested EGPs, which themselves can include even further sets of hierarchically nested EGPs.

By way of example, a university can have its own microgrid composed of multiple individual power generation sites—e.g., hospital, dormitories, classroom buildings, sports complex, facilities plant, etc. Within each generation site can be one or more nested generation sites—each dormitory building can have its own power generation site; the sports complex can include an indoor arena, an outdoor arena, exercise facilities, each with its own generation site. It should be readily understood that embodying systems and methods are not so limited, and that other structures and relationships between the structures are within the contemplation of this disclosure.

Figure 2:
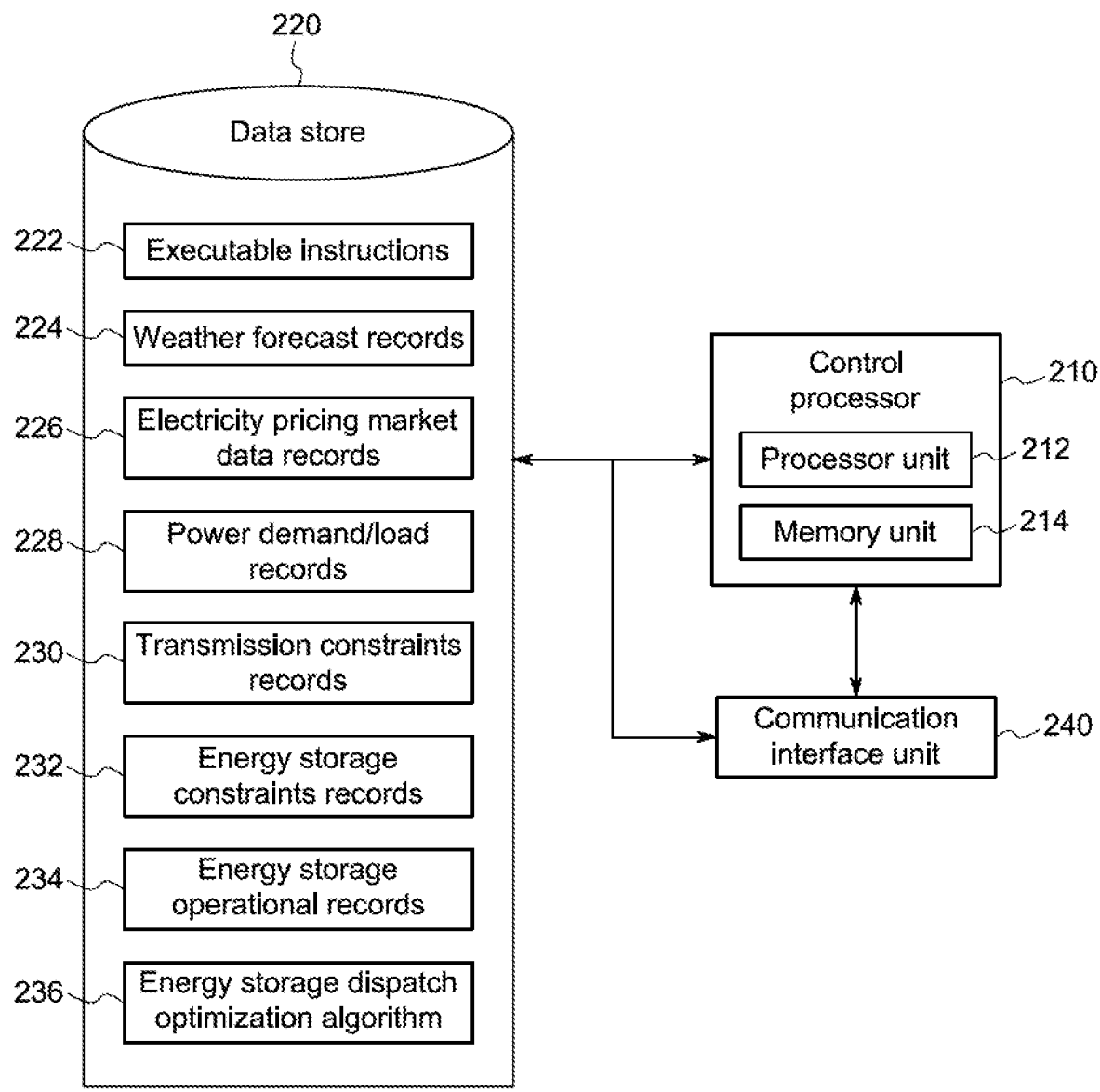
FIG. 2 depicts an energy storage dispatch optimization unit in accordance with embodiments.

With reference again to FIG. 1A, local EGP 100 and nested EGPs 130, ..., 13N include energy storage dispatch optimization unit 140. FIG. 2 depicts energy storage dispatch optimization unit 140 in accordance with embodiments. An embodying energy storage dispatch optimization unit can include control processor 210 in communication with data store 220. The control processor can be in direct communication with the data store, or in indirect communication across an electronic communication network via communication interface unit 240. Processor unit 212 can execute executable instructions 222, which cause the processor to perform energy storage dispatch optimization algorithm 236. Memory unit 214 can provide the control processor with local cache memory.

Data store 220 can include data and records accessed by optimization algorithm 236. This information can include weather forecast records 224, electricity pricing market data records 226, power demand/load records 228, transmission constraints records 230, energy storage constraints records 232, and energy storage operational records 234. The weather forecast records can include expected environmental conditions (wind forecast and solar radiance,) for the site location of the local EGP. Other types of forecast can include fuel price.

With regard again to FIG. 1A, the energy storage dispatch optimization unit can provide a charge/discharge profile and a power shed recommendation. The profile and shed recommendation can be used by energy storage plant control (ESPC) unit 150. The ESPC unit can perform a supervisory control and data acquisition function for local EGP 100. For example, the ESPC can monitor and control operation of the energy sources and the energy storage device. The ESPC unit can act on the charge/discharge profile from optimization unit 140 to control whether the energy storage device sinks or sources energy. ESPC unit 150 can control directional flow of power through coupling point 170, where local EGP connects to a transmission line. The ESPC unit achieves power flow direction control by controlling a switching network that can include bidirectional switches, relays, converters, inverters, and the like that are in electrical communication with coupling point 170, the feeder line, and components of the local EPG. Energy produced by energy sources 110 can be provided through coupling point 170 for consumption by loads external to the local EPG.

Each nested EPGs includes energy storage dispatch optimization unit 140A and ESPC unit 150, which in combination control the energy flow (sink/source) to/from the respective EPG. The optimization unit of a nested EPG can, in some situations, determine that the EPG should store energy generated within the nested EPG without requiring additional energy from an EPG above it in the hierarchy. If a nested EPG is sourcing energy (as determined by its optimization unit), it can provide that energy to an EPG above it in the hierarchy. If a nested EPG's optimization unit determines that the EPG requires more energy than it can produce, the EPG can receive energy from an EPG above it in the hierarchy.

In some implementations, power generated by local EPG 100 can be consumed locally by loads in its energy load block 120. For example, the EPG can be at an industrial, residential, municipal, or hospital facility. Other types and natures of loads are also within contemplation of this disclosure. Further, locally generated energy can be consumed by one or more nested EGPs 130, . . . , 13N. In some implementations, nested EGPs 130, . . . , 13N can source energy to another EGP (for example, EGP 100). The energy sourced from the nested EGPs can be stored in energy storage device 118, or sourced through coupling point 170 under control by ESPC unit 150.

Figure 3:
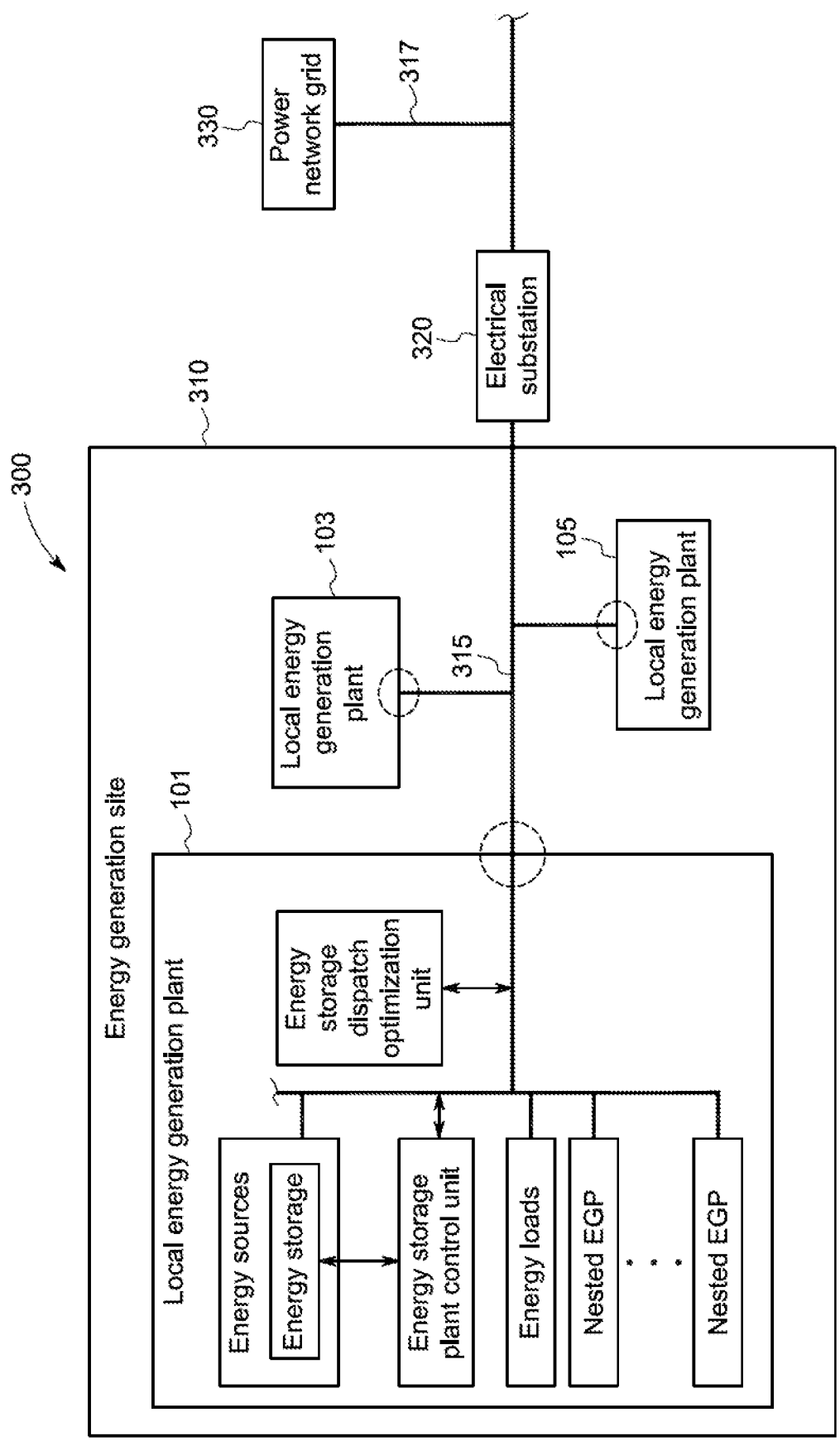
FIG. 3 depicts an energy site configuration in accordance with embodiments.

FIG. 3 depicts energy site configuration 300 in accordance with embodiments. This site configuration includes energy generation site 310, which includes a plurality of local EGPs 101, 103, 105 each in electrical communication through a respective coupling point with transmission line 315. A first terminal of electrical substation 320 is coupled to transmission line 315. A second terminal of the electrical substation can be coupled to power network grid 330 through transmission line 317.

Energy can be sourced from energy generation site 310 to substation 320. In some implementations, energy can be provided from the power network grid through electrical substation 320 to energy generation site 310. Respective energy storage dispatch optimization units in each local EGP determines a charge/discharge profile and power shed recommendation for its respective local EGP. The profile and recommendation is acted on by respective ESPC units. For example, local EGP 101 can source its energy to transmission line 315; local EGP can sink its energy to its own internal energy storage device; and local EGP can obtain energy via transmission line 315.

Figure 4:
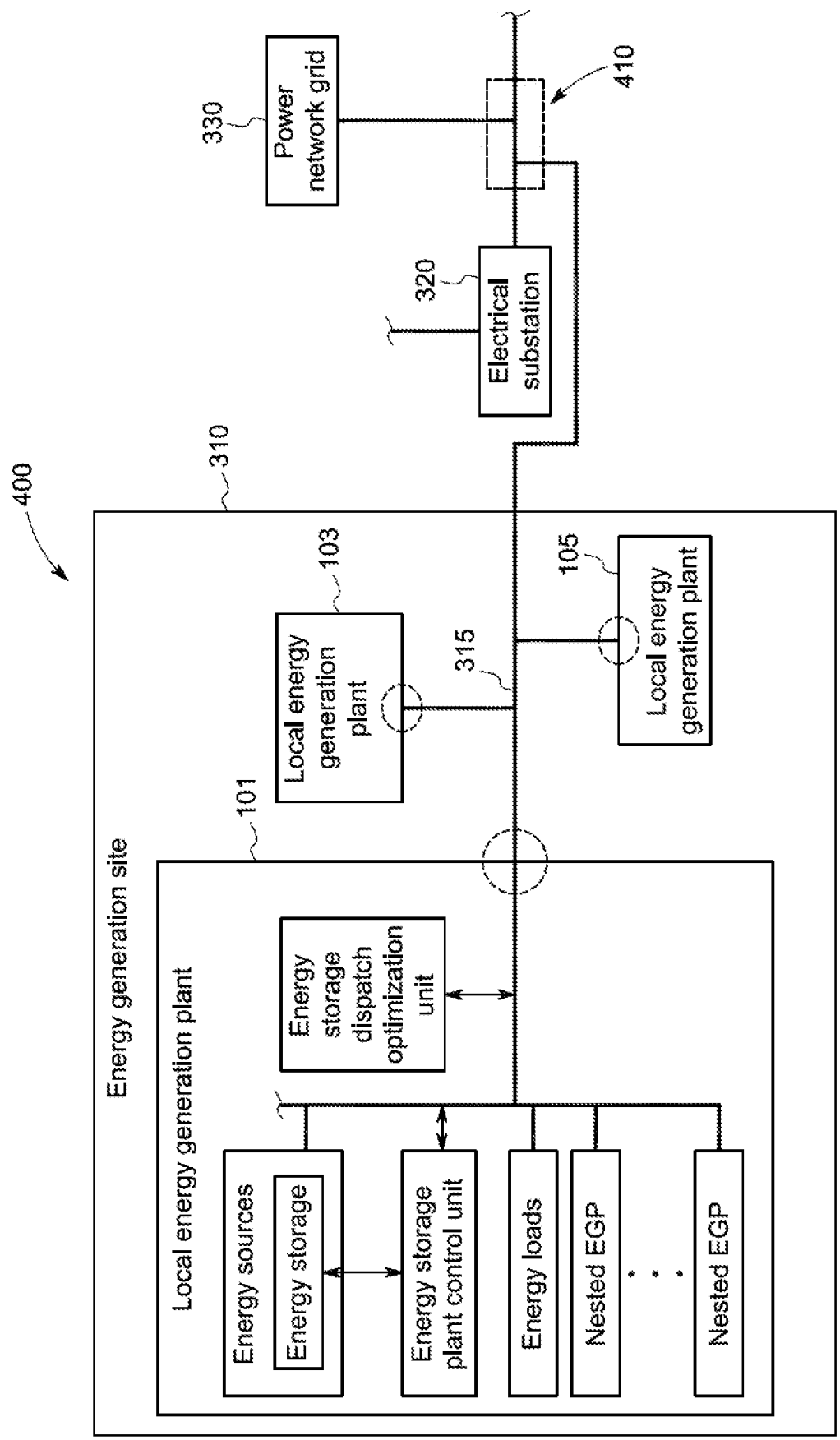
FIG. 4 depicts another energy site configuration in accordance with embodiments.

FIG. 4 depicts second energy site configuration 400 in accordance with embodiments. In accordance with embodiments, energy generation site 310 is in electrical communication with transmission line junction 410, where the electrical substation and power network grid are coupled together. In this implementation, power generated from site 310 can be provided directly to the power network grid, or to loads that might be also coupled to transmission line junction 410. Similarly, power can be supplied to loads through the electrical substation. Energy generation site 310 can receive power directly from the power network grid and/or through the electrical substation.

Figure 5:
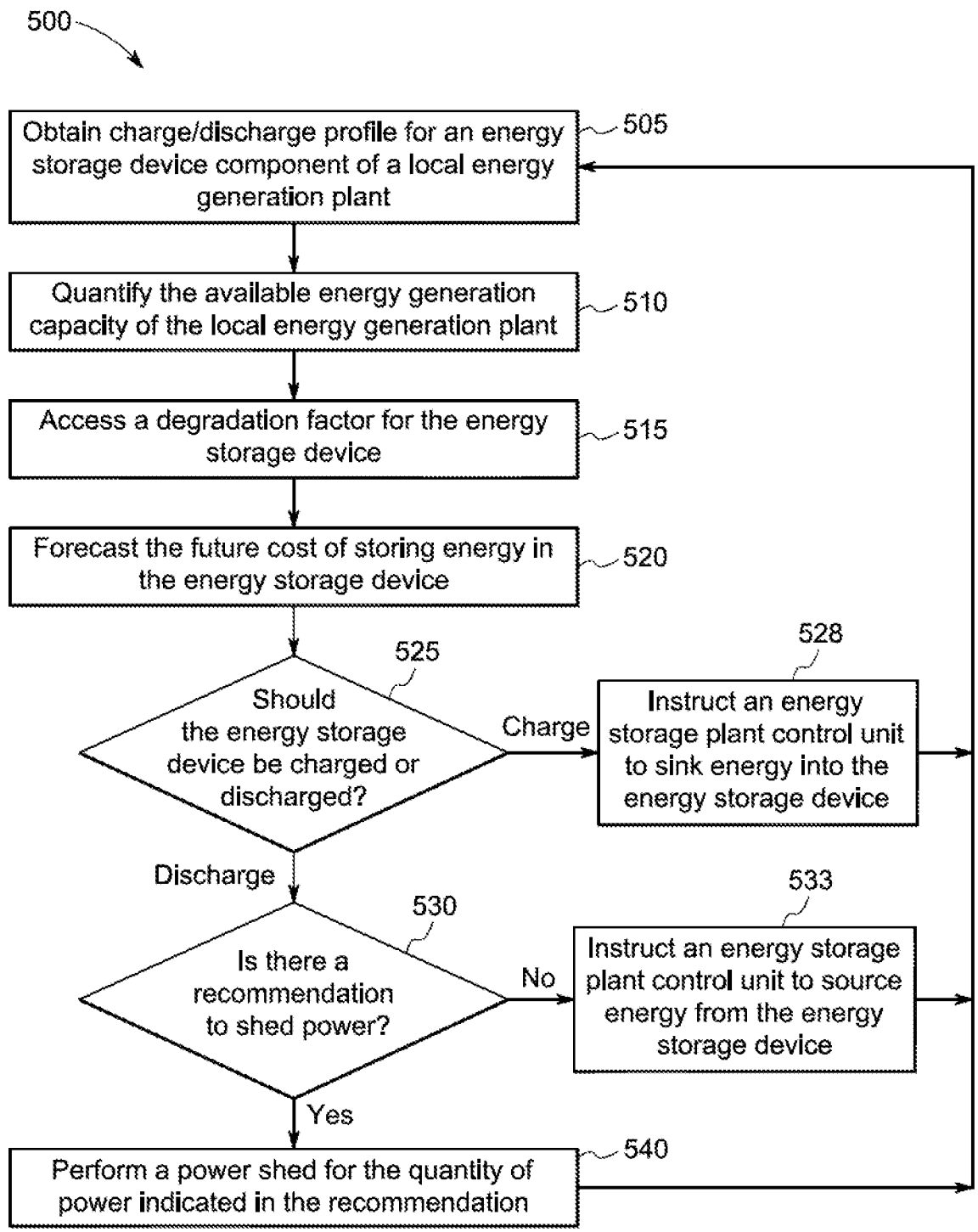
FIG. 5 depicts a flowchart for a process to optimize energy storage device dispatch in accordance with embodiments.

FIG. 5 depicts process 500 for implementing an embodiment of energy storage dispatch optimization algorithm 236. A charge/discharge profile for an energy storage device that is a component of a local energy generation plant is obtained, step 505. The charge/discharge profile can be obtained from data store records. Alternatively, the charge/discharge profile can be provided from an energy storage dispatch optimization unit that accesses information regarding the local EGP, its component devices, and power market conditions. The available energy generation capacity for the local EGP is quantified, step 510. This quantification of available energy for the local EGP can include consideration of the energy requirements for each (singly, grouping, or entire) nested EGP below it in the hierarchy—i.e., whether the nested EGP is sourcing/sinking energy, or is energy flow neutral. A degradation factor for the energy storage device(s) is accessed, step 515. The degradation factor representing the impact of multiple charge/discharge cycles, stored energy levels, and other characteristics of the energy storage device.

The future cost of storing energy in the energy storage device is forecasted, step 520. The forecast provides information on whether the amount of energy being proposed for storage is monetarily beneficial.

The forecast future cost can be used in determining, step 525, whether the energy storage device should be charged to preserve energy for future delivery, or be discharged to minimize the expense of energy delivery from the local EGP. The time horizon for this assessment can change based on specific use cases. In some implementations, the charge/discharge calculus can be based on any timeframe—e.g., day/week/month/year/lifetime of the asset.

If the decision is made to charge the energy storage device, instruction is provided, step 528, to ESPC unit 150 to sink energy to the energy storage device. The ESPC unit configures feeder line 160 to sink energy output from energy sources 110 to the energy storage device. In some implementations, coupling point 170 can be configured to permit a flow of energy into the energy storage device from external sources connected to a transmission line.

If the decision is made to discharge the energy storage device, a determination, step 530, is made whether a recommendation to shed power was provided. If there is no power shed recommendation, instruction is provided, step 533, to ESPC unit 150 to source energy from the energy storage device. The ESPC unit configures the feeder line to provide energy to one or more load components of the local EPG. In some implementations, coupling point 170 can be configured to provide energy to the transmission line. If there is a shed power recommendation, the ESPC unit configures the feeder line to shed power from the energy storage device and the energy sources of the local EPG.

It is possible that one or all of the charge/discharge profile (step 505), the energy generation capacity (step 510), and/or the degradation factor (step 515) can change due to variances in the underlying factors and/or parameters used in developing these items. Process 500 returns to step 505 after the energy storage device is charged (step 528), discharged (step 533), or the power shed is performed (step 540). The next iteration of implementing the energy storage dispatch optimization algorithm can use updated factors.

In accordance with embodiments, quantifying the energy generation capacity of the local EPG can include identifying the available energy output of DC and AC energy generators and the potential demand of loads in the local EPG. The degradation factor can be based on the energy storage device operating condition from a table or model, which includes manufacture specifications for the device. Forecasting the future cost of storing energy can include accommodation for electrical system operator financial models, power demand models, power purchase agreements, single price strips or multiple price strips, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining an optimal time to dispatch an energy storage device, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A system to control energy dispatch for an energy storage device, the system comprising:
   a local energy generation plant, the local energy generation plant including:
      the energy storage device, a plurality of energy sources, an energy load block, an energy storage dispatch optimization unit, an energy storage plant control unit, and at least one nested energy generation plant; and
   a single feeder line electrically connecting the energy storage device, the plurality of energy sources, the energy load block, the energy storage dispatch optimization unit, the energy storage plant control unit, and the at least one nest energy generation plant, the single feeder line configured to source, sink, and shed energy from the energy storage device, the plurality of energy sources, and the at least one nested energy generation plant;
   the energy storage dispatch optimization unit including a processor in communication with a data store;
   the data store including executable instructions that when executed by the processor cause the processor to perform a method, the method including:
      obtaining a charge/discharge profile for the energy storage device;
      quantifying an amount of energy generation available from the plurality of energy sources and the at least one nested energy generation plant of the local energy generation plant;
      assessing a degradation factor for the energy storage device;
      forecasting a future cost for storing energy in the energy storage device based on the charge/discharge profile, the amount of energy generation available from at least one of the plurality of energy sources or the at least one nested energy generation plant, and the degradation factor;
      establishing, based on the charge/discharge profile, the amount of energy generation available from at least one of the plurality of energy sources or the at least one nested energy generation plant, the degradation factor, and the forecasted future cost, that the energy storage device should be discharged instead of charged;
      determining, subsequent to establishing that the energy storage device should be discharged, whether i) to source energy from at least one of the energy storage device or the at least one nested energy generation plant, or ii) to shed power from the energy storage device and the plurality of energy sources or the at least one nested energy generation plant; and
      based on the determination:
         i) transmitting a first instruction to the energy storage plant control unit that causes the energy storage plant control unit to configure the singe feeder line to source energy from the energy storage device to one or more load components of the local energy generation plant; or
         ii) transmitting a second instruction to the energy storage plant control unit that causes the energy storage plant control unit to configure the single feeder line to shed power from the energy storage device and at least one of the plurality of energy sources or the at least one nested energy generation plant.

2. The system of claim 1, the executable instructions causing the processor to obtain the charge/discharge profile by accessing profile records in the data store or developing the charge/discharge profile from one or more parameters for the local energy generation plant, the plurality of energy sources and the one or more load components of the local energy generation plant, the energy storage device, environmental conditions, and electricity distribution market.

3. The system of claim 1, the executable instructions causing the processor to perform the method by including in the degradation factor a number of charge/discharge cycles, a current energy storage level of the energy storage device, and a manufacturer life specification for the energy storage device.

4. The system of claim 1, the executable instructions causing the processor to forecast the future cost by applying the degradation factor to operational conditions of the energy storage device to provide information on monetary cost for storing the energy.

5. The system of claim 1, the executable instructions causing the processor to perform the method by controlling the energy storage plant control unit to configure a switch network in response to instructions to increase or decrease the energy storage.

6. The system of claim 1, the executable instructions causing the processor to perform the method by including in the quantifying the amount of energy generation an energy requirement of the at least one nested energy generation plant at a lower position in a hierarchy that includes the local energy generation plant and the at least one nested energy generation plant.

7. A method of energy dispatch for an energy storage device component of a local energy generation plant, the method comprising:
   obtaining a charge/discharge profile for the energy storage device, the energy storage device electrically connected to a single feeder line of the local energy generation plant;
   quantifying an amount of energy generation available from a plurality of energy sources and at least one nested energy generation plant of the local energy generation plant, each of the plurality of energy sources and the at least one nested energy generation plant of the local energy generation plant electrically connected to the single feeder line;
   assessing a degradation factor for the energy storage device;
   forecasting a future cost for storing energy in the energy storage device based on the charge/discharge profile, the amount of energy generation available from at least one of the plurality of energy sources or the at least one nested energy generation plant, and the degradation factor;
   establishing, based on the charge/discharge profile, the amount of energy generation available from at least one of the plurality of energy sources or the at least one nested energy generation plant, the degradation factor, and the forecasted future cost, that the energy storage device should be discharged instead of charged;
   determining, subsequent to establishing that the energy storage device should be discharged, whether i) to source energy from at least one of the energy storage device or the at least one nested energy generation plant, or ii) to shed power from the energy storage device and at least one of the plurality of energy sources or the at least one nested energy generation plant; and based on the determination:
   i) transmitting a first instruction to an energy storage plant control unit that causes the energy storage plant control unit to configure the single feeder line to source energy from the energy storage device to one or more load components of the local energy generation plant; or
   ii) transmitting a second instruction to the energy storage plant control unit that causes the energy storage plant control unit to configure the single feeder line to shed power from the energy storage device and at least one of the plurality of energy sources or the at least one nested energy generation plant.

8. The method of claim 7, obtaining the charge/discharge profile by accessing profile records in a data store or developing the charge/discharge profile from one or more parameters for the local energy generation plant, the plurality of energy sources and the one or more load components of the local energy generation plant, the energy storage device, environmental conditions, and electricity distribution market.

9. The method of claim 7, the degradation factor including a number of charge/discharge cycles of the energy storage device, a current energy storage level of the energy storage device, and a manufacturer life specification for the energy storage device.

10. The method of claim 7, forecasting the future cost including applying the degradation factor to operational conditions of the energy storage device to provide information on monetary cost for storing the energy.

11. The method of claim 7, the energy storage plant control unit configuring a switch network in response to instructions to increase or decrease the energy storage.

12. The method of claim 7, including in the quantifying the amount of energy generation an energy requirement of the at least one nested energy generation plant at a lower position in a hierarchy that includes the local energy generation plant and the at least one nested energy generation plant.

13. A non-transitory computer-readable medium having stored thereon instructions which when executed by a processor cause the processor to perform a method of energy dispatch for an energy storage device component of a local energy generation plant, the method comprising:
   obtaining a charge/discharge profile for the energy storage device, the energy storage device electrically connected to a single feeder line of the local energy generation plant;
   quantifying an amount of energy generation available from a plurality of energy sources and at least one nested energy generation plant of the local energy generation plant, each of the plurality of energy sources and the at least one nested energy generation plant of the local energy generation plant electrically connected to the single feeder line;
   assessing a degradation factor for the energy storage device;
   forecasting a future cost for storing energy in the energy storage device based on the charge/discharge profile, the amount of energy generation available from at least one of the plurality of energy sources and the at least one nested energy generation plant, and the degradation factor;
   establishing, based on the charge/discharge profile, the amount of energy generation available from at least one of the plurality of energy sources or the at least one nested energy generation plant, the degradation factor, and the forecasted future cost, that the energy storage device should be discharged instead of charged;

determining, subsequent to establishing that the energy storage device should be discharged, whether i) to source energy from at least one of the energy storage device or the at least one nested energy generation plant, or ii) to shed power from the energy storage device and at least one of the plurality of energy sources or the at least one nested energy generation plant; and based on the determination:
  i) transmitting a first instruction to an energy storage plant control unit that causes the energy storage plant control unit to configure the single feeder line to source energy from the energy storage device to one or more load components of the local energy generation plant; or
  ii) transmitting a second instruction to the energy storage plant control unit that causes the energy storage plant control unit to configure the single feeder line to shed power from the energy storage device and at least one of the plurality of energy sources or the at least one nested energy generation plant.

14. The medium of claim 13, the executable instructions causing the processor to obtain the charge/discharge profile by accessing profile records in a data store or developing the charge/discharge profile from one or more parameters for the local energy generation plant, the plurality of energy sources and the one or more load components of the local energy generation plant, the energy storage device, environmental conditions, and electricity distribution market.

15. The medium of claim 13, the executable instructions causing the processor to perform the method by including in the degradation factor a number of charge/discharge cycles of the energy storage device, a current energy storage level of the energy storage device, and a manufacturer life specification for the energy storage device.

16. The medium of claim 13, the executable instructions causing the processor to forecast the future cost by applying the degradation factor to operational conditions of the energy storage device to provide information on monetary cost for storing the energy.

17. The medium of claim 13, the executable instructions causing the processor to perform the method by controlling the energy storage plant control unit to configure a switch network in response to instructions to increase or decrease the energy storage.

18. The medium of claim 13, the executable instructions causing the processor to perform the method by including in the quantifying the amount of energy generation an energy requirement of the at least one nested energy generation plant at a lower position in a hierarchy that includes the local energy generation plant and the at least one nested energy generation plant.

* * * * *